United States Patent
Suryanarayana et al.

(10) Patent No.: US 10,261,821 B2
(45) Date of Patent: Apr. 16, 2019

(54) SYSTEM AND METHOD TO EXPOSE REMOTE VIRTUAL MEDIA PARTITIONS TO VIRTUAL MACHINES

(71) Applicant: Dell Products L.P., Round Rock, TX (US)

(72) Inventors: Shekar Babu Suryanarayana, Bangalore (IN); Lucky Pratap Khemani, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 15/367,841

(22) Filed: Dec. 2, 2016

(65) Prior Publication Data

US 2018/0157509 A1     Jun. 7, 2018

(51) Int. Cl.
*G06F 9/455*     (2018.01)

(52) U.S. Cl.
CPC ........ *G06F 9/45558* (2013.01); *G06F 2009/45583* (2013.01); *G06F 2009/45595* (2013.01)

(58) Field of Classification Search
CPC ....... G06F 9/45558; G06F 2009/45595; G06F 2009/45583
See application file for complete search history.

(56) References Cited

U.S. PATENT DOCUMENTS

| | | | | |
|---|---|---|---|---|
| 8,635,613 B1* | 1/2014 | Vargas, Jr. | ............ | G06Q 10/06 715/733 |
| 2006/0005189 A1* | 1/2006 | Vega | ............ | G06F 9/4856 718/1 |
| 2006/0253731 A1* | 11/2006 | Petruzzo | ............ | G06F 11/1456 714/6.2 |
| 2009/0089527 A1* | 4/2009 | Schoenberg | ............ | G06F 9/45558 711/163 |
| 2009/0300599 A1* | 12/2009 | Piotrowski | ............ | G06F 21/53 717/174 |
| 2009/0319768 A1* | 12/2009 | Ezaki | ............ | G06F 9/4416 713/2 |
| 2010/0198972 A1* | 8/2010 | Umbehocker | ............ | G06F 3/0604 709/226 |
| 2010/0199351 A1* | 8/2010 | Protas | ............ | G06F 21/577 726/25 |

(Continued)

FOREIGN PATENT DOCUMENTS

| | | |
|---|---|---|
| CN | 103984590 A | 8/2014 |
| WO | 2009106938 A1 | 9/2009 |

OTHER PUBLICATIONS

HP Technical White Paper, HP iLO Federation, 9 pages, Sep. 2014.

*Primary Examiner* — Adam Lee
(74) *Attorney, Agent, or Firm* — Baker Botts L.L.P.

(57) ABSTRACT

Systems and methods are disclosed for managing access to a remote storage media with a management controller. The method may include managing a first virtual machine and a second virtual machine with a hypervisor operating on a first information handling system; permitting the first virtual machine access to a first portion of a remote storage media, the remote storage media local to a second information handling system, the second information handling system located remote from the first information handling system; and preventing a second virtual machine access to the first portion of the remote storage media.

15 Claims, 3 Drawing Sheets

(56) References Cited

U.S. PATENT DOCUMENTS

| | | | |
|---|---|---|---|
| 2011/0022812 A1* | 1/2011 | van der Linden | G06F 9/5077 711/163 |
| 2011/0029974 A1* | 2/2011 | Broyles | G06F 21/57 718/1 |
| 2011/0145821 A1* | 6/2011 | Philipson | G06F 21/83 718/1 |
| 2012/0174095 A1* | 7/2012 | Natchadalingam | G06F 8/65 718/1 |
| 2012/0331465 A1* | 12/2012 | Tanikawa | G06F 9/5077 718/1 |
| 2013/0297901 A1* | 11/2013 | Nakada | G06F 12/1416 711/163 |
| 2014/0137180 A1* | 5/2014 | Lukacs | G06F 21/53 726/1 |
| 2014/0365816 A1* | 12/2014 | Antony | G06F 9/45558 714/6.11 |
| 2015/0100791 A1* | 4/2015 | Chen | G06F 12/1408 713/189 |
| 2015/0350188 A1* | 12/2015 | Gilpin | G06F 21/33 726/9 |
| 2016/0072817 A1* | 3/2016 | Makhervaks | H04L 63/0236 726/3 |
| 2016/0092677 A1* | 3/2016 | Patel | G06F 21/55 726/23 |
| 2016/0132358 A1* | 5/2016 | Antony | G06F 9/5044 726/4 |
| 2016/0246717 A1* | 8/2016 | Patil | G06F 12/0806 |
| 2016/0246961 A1* | 8/2016 | Wang | G06F 12/084 |
| 2017/0164198 A1* | 6/2017 | Furuichi | H04W 4/70 |
| 2018/0032443 A1* | 2/2018 | Kaplan | G06F 12/1027 |
| 2018/0129611 A1* | 5/2018 | Parker | G06F 12/0284 |

* cited by examiner

SYSTEM AND METHOD TO EXPOSE REMOTE VIRTUAL MEDIA PARTITIONS TO VIRTUAL MACHINES

TECHNICAL FIELD

This disclosure relates generally to information handling systems and, more particularly, to a system and method for exposing remote virtual media partitions to virtual machines.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may support virtualization, such that one or more virtual machines may concurrently operate on an information handling system. Each virtual machine may function as an independent information handling system with, for example, its own operating system and dedicated resources.

In addition, information handling systems may share resources among each other, such that resources local to one information handling system may be accessed by another information handling system, even if the systems are located remotely from each other. An information handling system may manage and control which resources are accessible by other systems and the restrictions, if any, placed on such access. When sharing resources, it may also be desirable to control access to the shared resources between the virtual machines running on each information handling system.

SUMMARY

In accordance with some embodiments of the present disclosure an information handling system may include a hypervisor configured to manage a first virtual machine and a second virtual machine operating on the information handling system. The information handling system may further include a management controller communicatively coupled to the hypervisor, the management controller configured to permit the first virtual machine access to a first portion of a remote storage media, the remote storage media local to a second information handling system, the second information handling system located remote from the information handling system; and prevent the second virtual machine access to the first portion of the remote storage media.

In accordance other embodiments of the present disclosure, a method for managing access to a remote storage media with a management controller may include managing a first virtual machine and a second virtual machine with a hypervisor operating on a first information handling system. The method may also include permitting the first virtual machine access to a first portion of a remote storage media, the remote storage media local to a second information handling system, the second information handling system located remote from the first information handling system. The method may further include preventing a second virtual machine access to the first portion of the remote storage media.

In accordance other embodiments of the present disclosure, a method for remotely managing virtual machines may include accessing a master management controller from a remote information handling system, the master management controller communicably coupled to a plurality of member management controllers, wherein the master management controller and the plurality of member management controllers are members of a management controller group. The method may also include selecting a first virtual machine operating on a first information handling system to have access to a storage media, the storage media located at the remote information handling system, wherein the first information handling system includes a management controller in the management controller group.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
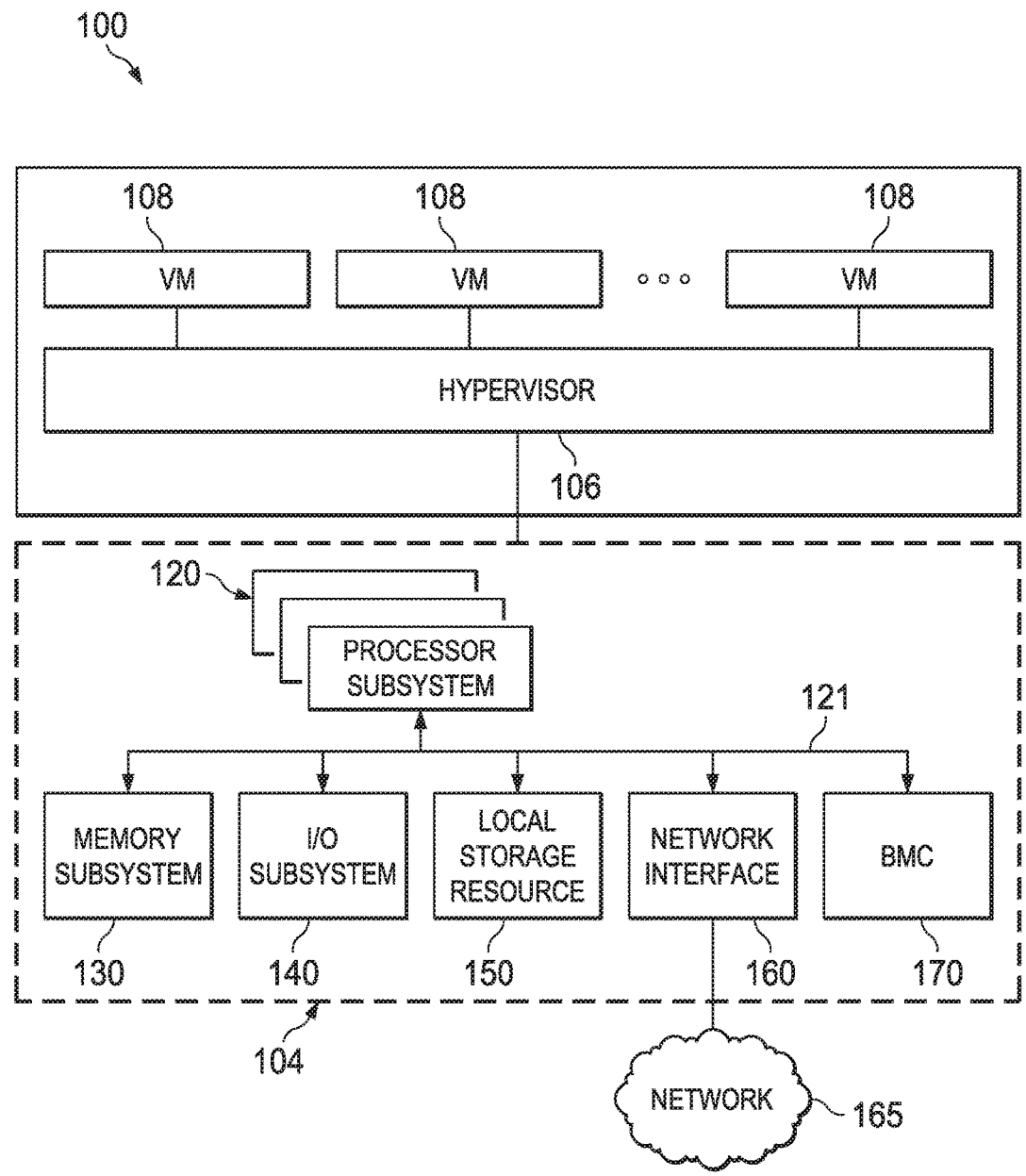
FIG. 1 illustrates a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, an information handling system may share one or more resources with other information handling systems. The information handling system may control which information handling systems have access to the shared resources, and the level of access permitted by each information handling system. For example, a resource that is local to one information handling system may be made accessible to a remote information handling system, such that resource appears as a local resource to the remote system.

In some embodiments, an information handling system may support virtualization. For example, an information handling system may include a hypervisor that allows one or more virtual machines to run on the information handling system. Each virtual machine on the information handling system may run its own operating system and otherwise function as an independent information handling system. When sharing resources between information handling systems, it may be desirable to control which virtual machines have access to shared resources.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 2:
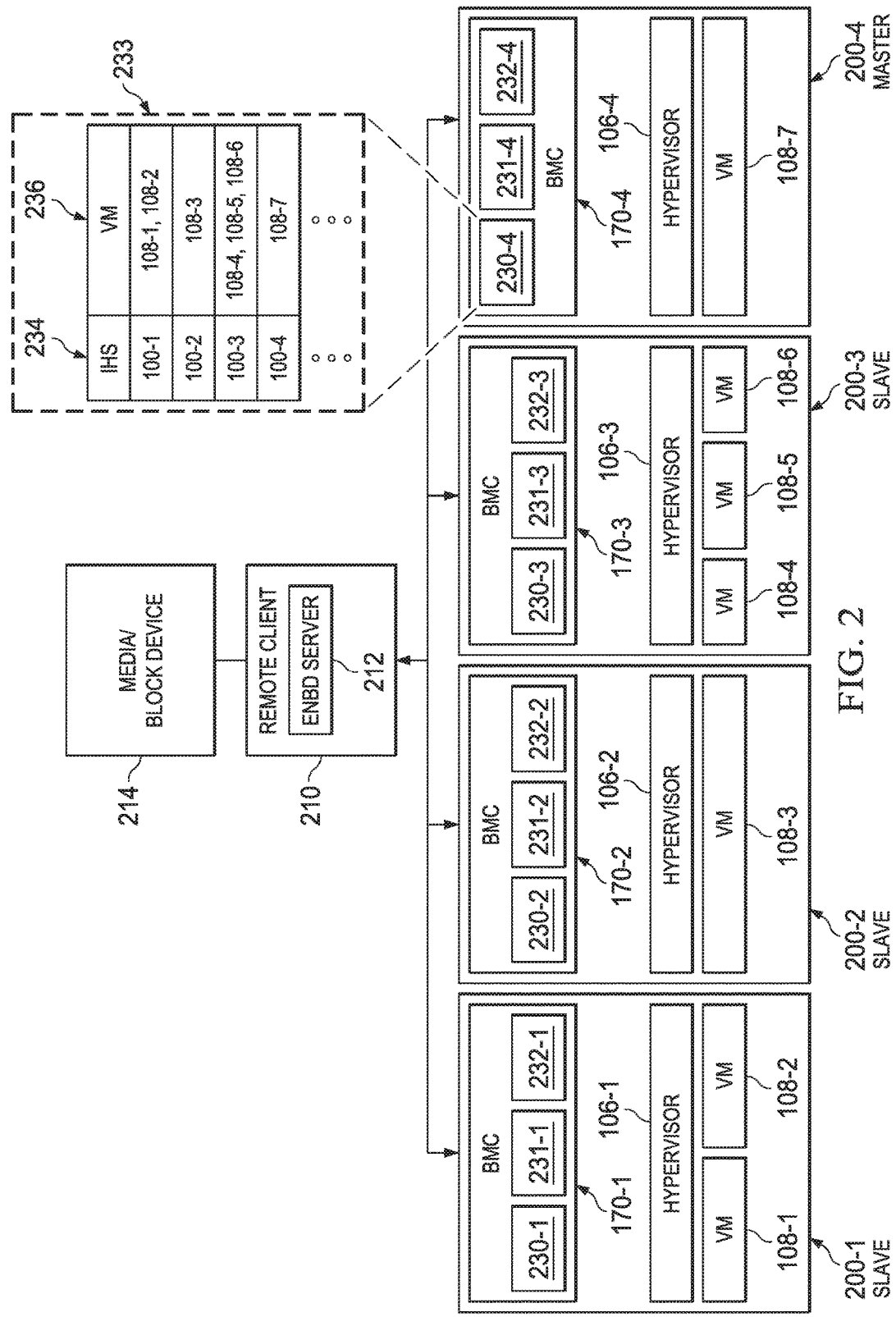
FIG. 2 illustrates a block diagram of selected elements of a networked group of information handling systems in accordance with some embodiments of the present disclosure.
Figure 3:
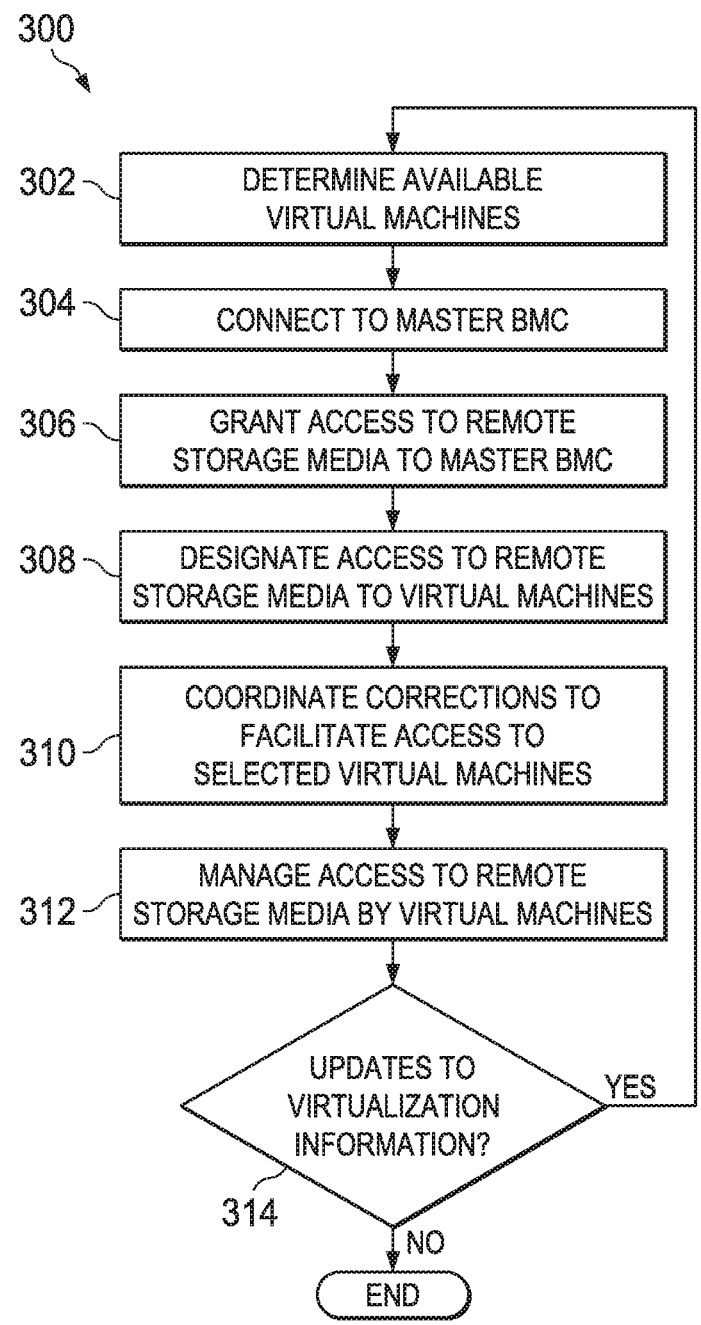
FIG. 3 illustrates a flowchart for managing access to a remote storage media by virtual machines.

Particular embodiments are best understood by reference to FIGS. 1-3 wherein like numbers are used to indicate like and corresponding parts.

FIG. 1 illustrates a block diagram of selected elements of an embodiment of an information handling system 100 in accordance with some embodiments of the present disclosure. In various embodiments, information handling system 100 may represent different types of information handling systems in an enterprise computing environment, such as a blade server, rack server, or another type of clustered computing resource. In yet other embodiments, information handling system 100 may be a personal computer, such as a desktop computer or a portable computer.

Components of information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, network interface 160, and baseboard management controller (BMC) 170. External or remote elements, such as network 165, are also shown to give context to an environment in which information handling system 100 may be configured to operate.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not expressly illustrated).

System bus 121 may represent a variety of suitable types of bus structures, including for example, a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, PCI bus, PCI-E bus, HyperTransport (HT) bus, Integrated Interchip Sound (IIS) bus, Serial Peripheral Interface (SPI) bus, Inter-Integrated Circuit (IIC or $I^2C$) bus, and Video Electronics Standards Association (VESA) local bus, among others. Although illustrated as a single bus in FIG. 1, system bus 121 may be implemented as a combination of one or more suitable busses, and in some embodiments, various components may use one or more different buses to communicate with other components of information handling system 100.

Memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may comprise a touch panel and display adapter. The touch panel (not expressly illustrated) may include circuitry for enabling touch functionality in conjunction with a display (not expressly illustrated) that is driven by display adapter (not expressly illustrated).

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In addition to local storage resources 150, in some embodiments, information handling system 100 may communicatively couple via network 165 to a network storage resource (not expressly illustrated) using network interface 160 discussed below.

Network interface 160 may be a suitable system, apparatus, or device operable to serve as an interface between information handling system 100 and network 165. Network interface 160 may enable information handling system 100 to communicate over network 165 using any suitable transmission protocol and/or standard, including but not limited to various transmission protocols and/or standards. Network 165 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages, generally referred to as data or information. In some embodiments, network 165 communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165, network interface 160, and/or various components associated therewith may be implemented using hardware, software, or any combination thereof. Network interface 160 may enable wired and/or wireless communications to and/or from information handling system 100.

In some embodiments, information handling system 100 may also include BMC 170, a management controller. BMC 170 may include any system, device, or apparatus configured to facilitate management and/or control of information handling system 100. For example, BMC 170 may be a microprocessor, microcontroller, DSP, ASIC, field-programmable gate array (FPGA), EEPROM, or any combination thereof. In some embodiments, BMC 170 may be coupled to or embedded on a planar motherboard (not expressly illustrated) of information handling system 100. In certain embodiments, BMC 170 may be configured to manage an interface between system management software and other components of information handling system 100. For example, BMC 170 may communicatively couple to one or more sensors or other elements of information handling system 100 such that a system administrator may access information about the system (e.g., temperature, cooling fan speeds, power mode, operating system status, etc.) to manage and/or monitor the operation of information handling system 100.

In some embodiments, BMC 170 may enable remote monitoring and management of information handling system 100. For example, BMC 170 may implement an Intelligent Platform Management Interface (IPMI) or another suitable management protocol, enabling a system administrator or management software to configure, monitor, and/or recover information handling system 100 locally or from a remote location. That is, a system administrator may interface with BMC 170 to monitor and/or manage information handling system 100 without having to travel to the location of the system. In certain embodiments, BMC 170 may be an instance of a Dell Remote Access Controller (DRAC) or an Integrated Dell Remote Access Controller (iDRAC).

BMC 170 may allow for out-of-band control of information handling system 100 to ensure access even when information handling system 100 is unavailable or compromised. For example, BMC 170 may have its own processor, memory, network connection, power, and/or access to the system bus (e.g., system bus 121 from FIG. 1). To enable out-of-band control, BMC 170 may include and/or interact with a network interface separate from network interface 160, thereby allowing communications to and from BMC 170 via a management channel physically isolated from an "in band" communication channel associated with network interface 160. Thus, if a failure (e.g., operating system failure, component failure, power failure, etc.) occurs in information handling system 100 that would otherwise prevent a system administrator from interfacing with information handling system 100 via network interface 160 and/or user I/O subsystem 140, the system administrator may still be able to manage and/or monitor information handling system 100 via BMC 170 to, for example, diagnose and/or repair problems that may have caused the failure. In the same or alternative embodiments, BMC 170 may allow a system administrator to remotely manage and configure one or parameters or profiles associated with operation of information handling system 100 and its various resources (e.g., power usage, processor allocation, memory allocation, security privileges, etc.).

Information handling system 100 may support virtualization. For example, information handling system 100 may include hypervisor 106 that is configured to manage one or more virtual machines 108. Hypervisor 106 may serve as the interface between virtual machines 108 and information handling resources 104 of information handling system 100.

Hypervisor 106 may comprise software and/or firmware generally operable to allow multiple operating systems to run on a single information handling system (e.g., information handling system 100) at the same time. This operability is generally allowed via virtualization, a technique for hiding the physical characteristics of information handling system resources from the way in which other systems, applications, or end users interact with those resources. Hypervisor 106 may be one of a variety of proprietary and/or commercially available virtualization platforms, including without limitation, VirtualLogix VLX, IBM's z/VM, Xen, Oracle VM, VMware's ESX Server, L4 Microkernel, Trango, Microsoft's Hyper-V, Sun's Logical Domains, Hitachi's Virtage, Kernal-based Virtual Machine, VMware Server, VMware Workstation, VMware Fusion, Qemu, Microsoft's Virtual PC And Virtual Server, and Oracle VM VirtualBox.

In one embodiment, hypervisor 106 may comprise a specially designed operating system (OS) with native virtualization capabilities. In another embodiment, hypervisor 106 may comprise a standard OS with an incorporated virtualization component for performing virtualization. In another embodiment, hypervisor 106 may comprise a standard OS running alongside a separate virtualization application. In this embodiment, the virtualization application of hypervisor 106 may be an application running above the OS and interacting with information handling resources 104 through the OS. Alternatively, the virtualization application of hypervisor 106 may, on some levels, interact indirectly with information handling resources 104 via the OS, and, on other levels, interact directly with information handling resources 104 (e.g., similar to the way the OS or firmware interacts directly with information handling resources 104). As a further alternative, the virtualization application of hypervisor 106 may interact directly with resources of information handling system 100 (e.g., similar to the way the OS or firmware interacts directly with information handling resources 104) without utilizing the OS, although still interacting with the OS to coordinate the use of information handling resources 104.

To allow multiple operating systems to run on information handling system 100 at the same time, hypervisor 106 may virtualize information handling resources 104 and present virtualized computer hardware representations to each of virtual machines 108. In other words, hypervisor 106 may assign to each of virtual machines 108, for example, one or more processors, one or more regions of memory in a memory subsystem, one or more components of an I/O subsystem, one or more other components of information handling resources 104, and/or any portion of any other hardware resources. The virtualized hardware representation presented to each of virtual machines 108 may comprise a mutually exclusive, or non-overlapping, set of hardware resources per virtual machine (e.g., no hardware resources are shared between virtual machines) or may comprise an overlapping set of hardware resources per virtual machine (e.g., one or more hardware resources may be shared by two or more virtual machines).

In one embodiment, hypervisor 106 may assign resources of information handling resources 104 statically such that the hardware resources assigned to certain virtual machines do not vary over time. Additionally or alternatively, hypervisor 106 may assign resources of information handling resources 104 dynamically such that the assignment of hardware resources to virtual machines 108 varies over time, for example, in accordance with the specific needs of the applications running on the individual virtual machines. Hypervisor 106 may keep track of the resource-to-virtual-machine mapping so that hypervisor 106 is able to determine the virtual machines to which any given resource of information handling resources 104 has been assigned.

Each of virtual machines 108 may include a guest operating system, along with any applications or other software running on the guest OS. Each guest OS may be any OS compatible with and/or supported by hypervisor 106. Virtual machines 108 may run the same or different guest OS. Although information handling system 100 is depicted as having three virtual machines 108, any number of virtual machines may be running on information handling system 100 at any given time.

Hypervisor 106 may virtualize the hardware resources of information handling resources 104 and present virtualized computer hardware representations to each of virtual machines 108. Each guest OS of virtual machines 108 may then begin to operate and run applications and/or other software using its assigned resources. That is, each guest OS may utilize information handling resources 104 assigned to the respective virtual machine by hypervisor 106.

FIG. 2 illustrates a block diagram of selected elements of a networked group of information handling systems in accordance with some embodiments of the present disclosure. Information handling systems 200 may represent embodiments of information handling system 100 discussed above with respect to FIG. 1. Information handling systems 200 may be communicably coupled such that the systems may communicate information to and from each other. For example, information handling systems 100 may be coupled via a network, such as network 165 discussed above with respect to FIG. 1. In certain embodiments, information handling systems 200 may be located in a datacenter and be part of a local area network.

Information handling systems 200 may include management controllers, BMCs 170, having the features described above with respect to FIG. 1. One or more management controllers may be grouped in a management controller group. For example, BMCs 170 of information handling systems 200 may be members of a common management controller group. Grouping BMCs 170 may simplify management of multiple information handling systems by, for example, providing a single of point access to all information handling systems 200 within the group. To illustrate, a system administrator may access, manage, and/or control any information handling system 200 (e.g., information handling systems 200-1, 200-2, 200-3, or 200-4) through one BMC 170 (e.g., BMC 170-1, 170-2, 170-3, or 170-4).

A member of the management controller group may be selected as the master of the group. The master BMC may perform one or more management tasks, including but not limited to managing the group membership, compiling information from members of the group, distributing information to members of the group, and providing a common access point from which to manage and/or control other systems in the management controller group. To illustrate, BMC 170-1, 170-2, 170-3, or 170-4 may be members of a common management controller group. BMC 170-4 of information handling system 200-4 may be selected master of the group by a system administrator or management software based on, for example, a random selection, resources, location, status, and/or another consideration. As master, BMC 170-4 may collect information from, control, and or provide access to other BMCs 170 in the management controller group and the corresponding information systems 200 (e.g., information handling systems 200-1, 200-2, and 200-3).

Member BMCs 170 in the management controller group may be communicably coupled to each other. In some embodiments, BMCs 170 may communicate over the same network resources used for non-management controller communications between information handling systems 200 (e.g., network interface 160 discussed in FIG. 1). In certain embodiments, BMCs 170 may be coupled to each other over a dedicated management communications channel, such as a network or I/O interface, including any variation of those described above with respect to FIG. 1. Communications between BMCs 170 may be unencrypted, encrypted, signed, or unsigned.

As discussed above with respect to FIG. 1, information handling systems may support virtualization. For example, each information handling system 200 may include hypervisor 106 that manages one or more virtual machines (VM) 108. As illustrated in FIG. 2, information handling system 200-1 includes hypervisor 106-1 controlling VMs 108-1 and 108-2; information handling system 200-2 includes hypervisor 106-2 controlling VM 108-3; information handling system 200-3 includes hypervisor 106-3 controlling VMs 108-4, 108-5, and 108-6; and information handling system 200-4 includes hypervisor 106-4 controlling VM 108-7.

To assist with management of the virtual machines, each information handling system 100 may monitor and compile virtualization information for the system. For example, BMC 170 may include a VM collector module 230. VM collector module 230 may maintain virtualization information related to hypervisor 106 and/or VMs 108 on a particular information handling system 200. Such virtualization information may include the type, version, OS, IP address, hostname, install date, services, or any other data related to hypervisor 106 and/or VMs 108. Virtualization information may be updated periodically (e.g., on a predetermined interval) or when the information changes (e.g., event driven updates). In some embodiments, VM collector module 230 may retain past virtualization information to enable tracking of changes to hypervisor 106 and/or VMs 108 over time. VM collector module 230 may maintain virtualization information in any suitable storage medium (e.g., memory or disk) in any suitable form (e.g., database, memory, or a file).

In addition to monitoring its own virtualization information, the master BMC may compile virtualization information across members of the management controller group. For example, master BMC 170-4 may compile virtualization information from BMC 170-1, 170-2, and 170-3 related to information handling systems 100-1, 100-2, and 100-3. Table 233 illustrates exemplary virtualization information compiled by master BMC 170-4. Column 234 identifies the information handling system for which the information relates, and column 236 comprises the corresponding virtual machines 108 operating on the corresponding system. The virtualization information compiled by master BMC 170-4 may be a subset or all of the virtualization information compiled by the various VM collector modules 230 at the individual group members BMCs 170. Although two-column table 233 is illustrated in FIG. 2, more, less, or different information may compiled by master BMC 170-4, and the information may be stored or represented in any suitable manner. Virtualization information collected at master BMC 170-4 may be updated periodically or when corresponding information changes at member BMCs 170.

In some embodiments, it may be desirable to make information local to remote information handling system 210 accessible to another information handling system 200. Information handling system 210 may be an embodiment of information handling system 100 described above with respect to FIG. 1. In some embodiments, information handling system 210 may be remote from information handling systems 200, by, for example, being on a separate network or at a physical location that is different from information handling systems 200. Nonetheless, a system administrator may seek to update software (e.g., OS, end application, etc.) or other data on particular VMs 108 running on information handling systems 200 from remote information handling system 210. To do so, the system administrator may make information (e.g., files, folders, disks, disks partition, etc.) stored on a remote storage media 214 (e.g., hard drive, disk drive, universal serial bus (USB) thumb drive, etc.) accessible to one or more BMCs 170.

Information handling systems 200 and 210 may include software and/or hardware operable to enable the sharing information from remote storage media 214. For example, information handling systems 200 and 210 may include components that support the Network Block Device (NBD) protocol or the Enhanced Network Block Device (ENDB) protocol. In some embodiments, remote information handling system 210 may include an ENBD server 212 and BMCs 170 of information handling systems 200 may include an ENBD client 232. ENBD server 212 may communicate with ENBD client 232 using the use the ENBD protocol to export remote storage media 214 from remote information handling system 210 to one or more information handling systems 200. In operation, ENBD client 232 may send requests to ENBD server 212 to access information stored on remote storage media 214. The ENBD server 212 may in turn respond with the requested data thereby allowing information on remote storage media 214 to be accessed by the requesting information handling system 200. In some embodiments, the requesting BMC 170 may use the ENBD service to emulate a partition of remote storage media 214 at the requesting information handling system 200. The ENBD protocol is one example of how information from local storage media 214 may be made accessible to information handling systems 200, and other techniques may be used in various embodiments.

In some embodiments, it may be desirable to control which VMs 108 on information handling systems 200 have access to remote storage media 214. BMCs 170 may include virtual media management module 231 to manage access of VMs 108 to remote storage media. Each BMC 170 may include a virtual media management module 231. Virtual media management module 231 may include any combination of hardware and software elements configured to manage access to remote storage media.

One role of virtual media management module 231 may include managing connections to support access to remote storage media 214. For example, virtual media management module 231-4 at master BMC 170-4 may access virtualization information (e.g., virtualization information stored in table 233) to determine which information handling system 200 is running the particular VM 108 needing access to remote storage media 214. In turn, virtual media management module 231-4 may communicate with virtual media management module 231 at the particular information handling system 200 running the VM needing access in order to establish any connections necessary to permit such access.

To illustrate, assume VM 108-3 running on information handling system 200-2 needs access to remote storage media 214. Virtual media management module 231-4 at master BMC 170-4 may communicate with virtual media management module 231-2 at BMC 170-2 to coordinate any connections necessary to establish access by VM 108-3 to remote storage media 214. In some embodiments, virtual media management modules 231 may configure an ENBD protocol connection between BMCs 170-4 and 170-2 such that BMC 170-2 may access remote storage media 214 through master BMC 170-4 on information handling systems 200-4. In other embodiments, virtual media management module 231-4 may provide information to virtual media management module 231-2 such that BMC 170-2 may configure an ENBD protocol connection with ENDB server 212 at remote information handling system 210 thereby permitting BMC 170-2 to access remote storage media 214 directly from remote information handling system 210. When access to remote storage media 214 is complete or no longer needed, virtual media management modules 231 may disable or disconnect any connections that are no longer in use.

In some embodiments, virtual media management module 231 may also manage access of VMs 108 to remote storage media 214. That is, virtual media management module 231 may manage which VMs 108 on a particular information handling system 200 have access to remote storage media 214. For example, virtual media management module 231-3 on information handling system 200-3 may limit access to remote storage media 214 to VMs 108-4 and 108-5, not permitting access to remote storage media 214 by VM 108-6. To this end, virtual media management module 231 may communicate with hypervisor 106 to control access to individual VMs 108. In some embodiments, virtual media management module 231 may manage access to particular portions of remote storage media 214. For example, virtual media management module 231 may limit access to VMs 108 to a particular partition, file, or folder on remote storage media 214. Access may be the same or different for across VMs 108. For example, virtual media management module 231-3 may permit virtual machines 108-4 to access a particular partition of remote storage media 214 and virtual machine 108-5 to access a different partition of local storage media 214. Access to remote storage media 214 by individual VMs 108 may be determined by the system administrator and/or management software from information handling systems 200 and/or 210.

In some embodiments, the above-described features of may be used to implement software updates for one or more VMs 108. For example, a system administrator may desire to update software on one or more VMs 108 running on information handling systems 200. To accomplish this goal, the system administrator may load the software updates on to remote storage media 214. By communicably coupling to master BMC 170-4, the system administrator may browse VMs 108 running on the various information handling systems 200 and select certain VMs 108 at which to update software. The system administrator may select a particular portion (e.g., a file, folder, partition, etc.) of remote storage media 214 to make accessible to the selected VMs 108. The master BMC 170-4 may in turn facilitate access to the remote storage media 214 by BMCs 170 at the information handling systems 200 where the selected VMs 108 are running. In some embodiments, the selected portions of remote storage media 214 may be made accessible to the selected VMs 108. In certain embodiments, the system administrator may include different software updates on separate portions of remote storage media 214, and may select a different selection of VMs 108 to have access to the selected portions of remote storage media 214. In this manner, any configuration of software updates (e.g., patches, applications, OS images, databases, etc.) may be selectively distributed to VMs 108 across the management controller group.

FIG. 3 illustrates an example method 300 for managing access to a remote storage media by virtual machines. Method 300 may begin at step 302, where available virtual machines are determined. As described above with respect to FIG. 2, information handling systems in the network may include a BMC with a VM collector module. The VM collector module may maintain virtualization information (e.g., type, version, OS, IP address, hostname, install date, services, or any other data related to hypervisor and/or VMs) related to a particular information handling system.

In step 304, a system administrator establishes a connection with a master BMC. As described above with respect to FIG. 2, one or more BMCs may be members of a management controller group. The master BMC may allow access to and/or management of other members of the management controller group. In some embodiments, the master BMC may maintain virtualization information for member BMCs such that a system administrator can browse, access, and/or control any virtual machines on any information handling system associated with a member BMC. The system administrator may establish a connection to the master BMC from a remote information handling system, which in some embodiments, may be located in a physical location that is remote from the other information handling systems.

In step 306, the system administrator may grant the master management controller access to a remote storage media. In some embodiments, the remote storage media may be a hard drive, disk drive, USB drive, or another form of media that is local to the remote information handling system. As described above with respect to FIG. 2, the remote information handling system may establish an ENDB protocol connection with the master BMC such that the master BMC may access information on the remote storage media. Access may be granted to some or all of the information on the remote storage media.

In step 308, the system administrator may designate access to the remote storage media to particular virtual machines on the network. For example, the system administrator may designate that a particular virtual machine should have access to the remote storage media. In some embodiments, the system administrator may designate access in broader terms by, for example, designating a percentage of virtual machines (e.g., a percentage of virtual machines on a particular information handling system or a percentage of virtual machines of all information handling systems) and/or a criteria of virtual machines (e.g., resources, OS, version, type, virtualization setup, host information handling system, or another criteria) that should have access to the remote storage media. In some embodiments, access may be designated to a particular partition, file, and/or folder on the remote storage media. In some embodiments, different virtual machines may grant access to different portions of remote storage media.

In step 310, the BMCs may coordinate connections to facilitate access by the selected virtual machines to the remote storage media. In some embodiments, the BMCs may include a virtual media management module configured to coordinate and manage any connections needed to access the remote storage media. For example, the virtual media management module of the master BMC may coordinate with the virtual media management module of a member BMC (e.g., a BMC on an information handling system with a virtual machine that has been granted access to the remote storage media) to establish any connections necessary to allow such access. As described above with respect to FIG. 2, access to the remote storage media may be established through the master BMC or by a direct connection from the member BMC to the remote information handling system.

In step 312, the BMCs may manage access to the remote storage media for the virtual machines in the network. For example, as described above with respect to step 308, access to remote storage media may be limited to certain virtual machines and/or particular portions of remote storage media. The virtual media management modules of the BMCs may ensure that access is correctly controlled such that only the selected virtual machines have access and to portions of the remote storage media as specified by the system administrator. In some embodiments, virtual machines that were not selected to have access to the remote storage media will not see the remote storage media as an available resource. The BMCs may coordinate access to individual VMs with the hypervisor or other virtualization resources on the information handling system.

In step 314, method 300 determines whether updates to virtualization information are needed. For example, virtual machines may be added, removed, and/or modified at a particular information handling system. Thus, updates to virtualization information may be made at member BMCs or the master BMC. Virtualization information may be updated periodically (e.g., on a predetermined interval) or when the information changes (e.g., event driven updates). If updates to virtualization information are needed, then method 300 may proceed back to step 302. Otherwise, no updates to virtualization information are needed and method 300 may end.

Method 300 may be implemented in any suitable manner. Although reference is made to a system administrator in FIGS. 1-3, any of the steps described above may be accomplished and/or initiated by software. It is noted that certain steps or operations described in method 300 may be optional or may be rearranged in different embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
one or more processors and one or more storage devices storing instructions that are operable, when executed by one or more computers, to cause the one or more computers to perform operations;
a hypervisor configured to:
manage a first virtual machine and a second virtual machine operating on the information handling system;
assign a first portion of a remote storage media to the first virtual machine at a first time in accordance with specific needs of applications running on the first virtual machine, the remote storage media local to a second information handling system, the second information handling system located remote from the information handling system; and
assign a second portion of the remote storage media to the second virtual machine at a second time in accordance with specific needs of applications running on the second virtual machine, the second time differing from the first time and the second portion differing from the first portion; and
a management controller communicatively coupled to the hypervisor, the management controller, in coordination with the hypervisor, configured to:
prevent the second virtual machine access to the first portion of the remote storage media;
permit the first virtual machine access to the first portion of the remote storage media at the first time;
prevent the first virtual machine access to the second portion of the remote storage media; and
permit the second virtual machine access to the second portion of the remote storage media at the second time.

2. The system of claim 1, wherein the management controller is a member in a management controller group.

3. The system of claim 2, wherein the management controller is further configured to:
collect virtualization information related to the first and second virtual machines and the hypervisor; and
communicate the virtualization information to a master management controller in the management controller group.

4. The system of claim 1, wherein assigning the first portion of the remote storage media to the first virtual machine includes establishing a network connection between the management controller and the second information handling system by the management controller.

5. The system of claim 4, wherein the network connection uses an enhanced network block device protocol.

6. A method for managing access to a remote storage media with a management controller comprising:
managing a first virtual machine and a second virtual machine with a hypervisor operating on a first information handling system;
assigning a first portion of the remote storage media to the first virtual machine at a first time by the hypervisor in accordance with specific needs of applications running on the first virtual machine, the remote storage media local to a second information handling system, the second information handling system located remote from the first information handling system;
assigning a second portion of the remote storage media to the second virtual machine at a second time by the hypervisor in accordance with specific needs of applications running on the second virtual machine, the second time differing from the first time and the second portion differing from the first portion:
preventing the second virtual machine access to the first portion of the remote storage media by the management controller;
permitting the first virtual machine access to the first portion of the remote storage media at the first time by the management controller;
preventing the first virtual machine access to the second portion of the remote storage media by the management controller; and
permitting the second virtual machine access to the second portion of the remote storage media at the second time by the management controller.

7. The method of claim 6, wherein the management controller is a member in a management controller group.

8. The method of claim 7, further comprising:
collecting virtualization information related to the first and second virtual machines and the hypervisor by the management controller; and
communicating the virtualization information to a master management controller in the management controller group by the management controller.

9. The method of claim 6, wherein assigning the first portion of the remote storage media to the first virtual machine includes establishing a network connection between the management controller and the second information handling system by the management controller.

10. The method of claim 9, wherein the network connection uses an enhanced network block device protocol.

11. A method for remotely managing virtual machines comprising:
accessing a master management controller from a third information handling system, the master management controller communicably coupled to a plurality of member management controllers, wherein the master management controller and the plurality of member management controllers are members of a management controller group;
selecting a first virtual machine operating on a first information handling system and assigning a first portion of a storage media at a first time to the first virtual machine in accordance with specific needs of applications running on the first virtual machine, the storage media located at the third information handling system, the first information handling system remote from the third information handling system, wherein the first information handling system includes a management controller in the management controller group;

selecting a second virtual machine operating on a second information handling system to and assigning a second portion of the storage media at a second time to the second virtual machine, the second information handling system remote from the first and third information handling systems, the second time differing from the first time, and the second portion differing from the first portion;

preventing the second virtual machine access to the first portion of the storage media;

permitting the first virtual machine access to the first portion of the storage media at the first time;

preventing the first virtual machine access to the second portion of the storage media; and permitting the second virtual machine access to the second portion of the storage media at the second time.

12. The method of claim 11, wherein the second information handling system includes a management controller in the management controller group.

13. The method of claim 11, wherein the first portion of the storage media includes a first software update and the second portion includes a second software update, the first software update different than the second software update.

14. The method of claim 13, further comprising:
installing the first software update on the first virtual machine; and
installing the second software update on the second virtual machine.

15. The method of claim 11, further comprising:
receiving updated information about the first and second virtual machines at the master management controller.

* * * * *